United States Patent [19]

Genba et al.

[11] Patent Number: 4,468,081
[45] Date of Patent: Aug. 28, 1984

[54] TERMINAL ASSEMBLY FOR CIRCUIT INTERRUPTER

[75] Inventors: Yasushi Genba; Shigemi Tamaru; Takayoshi Ishikawa; Kiyoshi Eguchi; Hideshi Takashita, all of Fukuyama, Japan

[73] Assignee: Mitsubishi Denki Kabushiki Kaisha, Tokyo, Japan

[21] Appl. No.: 398,697

[22] Filed: Jul. 15, 1982

[30] Foreign Application Priority Data

Jul. 16, 1981 [JP] Japan .......................... 56-106154[U]

[51] Int. Cl.³ ............................................ H01R 23/02
[52] U.S. Cl. ......................... 339/176 M; 339/210 M; 339/217 R
[58] Field of Search .............. 339/136 M, 138, 176 M, 339/198 G, 198 GA, 198 H, 206 R, 210 R, 210 M, 217 R

[56] References Cited

U.S. PATENT DOCUMENTS 2,918,647  12/1959  Britt ............................... 339/196 R

FOREIGN PATENT DOCUMENTS

| 1437480 | 10/1968 | Fed. Rep. of Germany ... 339/176 M |
| 1487520 | 4/1969 | Fed. Rep. of Germany ... 339/198 H |
| 1345089 | 10/1963 | France ......................... 339/198 GA |
| 2254126 | 7/1975 | France ......................... 339/198 H |
| 26984 | 8/1976 | Japan . |
| 29988 | 2/1980 | Japan . |
| 1014915 | 12/1965 | United Kingdom .......... 339/176 M |
| 1149372 | 4/1969 | United Kingdom ........ 339/198 GA |

*Primary Examiner*—John McQuade
*Attorney, Agent, or Firm*—Wenderoth, Lind & Ponack

[57] ABSTRACT

A terminal assembly for a circuit interrupter has a plurality of pairs of metallic spaced parallel flat load terminals with the flat surfaces of the terminals of a pair opposed to each other, the pairs of terminals being positioned side-by-side with spaces therebetween, there being one pair for each phase of the interrupter. Two side walls of insulating material are provided between each side-by-side pair of terminals and abutting each other, and two end walls of insulating material are provided on the outside of the outermost pairs of the terminals. The side walls and end walls have grooves therein holding the side edges of the terminals, the terminals projecting outwardly from between the side walls and end walls. Bolts extend through aligned bolt receiving holes. A plurality of projections are provided at spaced intervals around the holes on the opposite sides of the walls of the grooves, and there are recesses in the walls between adjacent projections, the projections on one abutting wall engaging in the recesses around the corresponding aligned holes of the other abutting wall. A pair of metallic plates are provided over the outer surface of the end walls, the projections on the end walls abutting the plates and spacing the walls and the plates.

2 Claims, 10 Drawing Figures

TERMINAL ASSEMBLY FOR CIRCUIT INTERRUPTER

BACKGROUND OF THE INVENTION

This invention relates to a terminal assembly for a circuit interrupter, and more particularly to a terminal assembly used with a circuit interrupter to connect a plurality of source terminals and a plurality of load terminals of a circuit interrupter to external electric conductors respectively.

High capacity circuit interrupters include a terminal assembly having a structure which is extremely strong and which has good electric insulation properties because such circuit interrupters generally produce a high electromagnetic force when a shortcircuit current flows therein. A general form of a conventional terminal assembly connected to a high capacity circuit interrupter has heretofore comprised a plurality of source terminals connected to circuits on the source side within the particular circuit interrupter and also to external electric conductors respectively, and a plurality of load terminals connected to circuits on the load side within the interrupter and also to external electric conductors respectively, the arrangement being that those source terminals are in spaced parallel relationship with associated load terminals, there being one pair of source and load terminals for each of the phases of the circuit interrupter. For example, the terminal assembly for three phase circuit interrupters has three pairs of source and load terminals disposed in parallel to one another. The plurality of the source and load terminals pairs have electrically insulating side plates therebetween and on outsides thereof, and a pair of metallic plates are disposed on the outer sides of the outermost side plates respectively. A plurality of bolts extend through the side plates and metallic plates and are fastened to the metallic plates by associated nuts thereby to fix the pairs of source and load terminals to one another.

From the foregoing it is seen that in the conventional terminal assembly, the source terminals, the load terminals and the side plates are assembled into separate units each including a plurality of the components and, after their assembling, the units are connected together into a unitary structure by bolt and nut means. Thus conventional terminal assemblies such as described above have been disadvantageous in that the assembling operation thereof is extremely difficult, and the electrically insulating side plates are also required to be thick because each of the outermost side plates is contacted by the metallic plate disposed outside thereof and a shortcircuit is apt to occur therebetween due to dielectric breakdown.

Accordingly it is an object of the present invention to provide a new and improved terminal assembly for a circuit interrupter capable of been easily assembled and having excellent electric insulation properties.

SUMMARY OF THE INVENTION

The present invention provides a terminal assembly for a circuit interrupter comprising a plurality of source terminals one for each of the phases of the circuit interrupter, a plurality of load terminals disposed in spaced parallel relationship with the source terminals respectively, a plurality of pairs of first and second side plates, each of the first and second side plates including on opposed inwardly facing surfaces grooves into which adjacent lateral edges of the source and load terminals are fitted and on the outwardly facing surfaces a plurality of projections with recesses therebetween, the projections and recesses being capable of being fitted into and onto mating recesses and projections disposed on the adjacent rear surface of the other of the first and second side plates, a plurality of bolts extending through the first and second side plates, each pair of the source and load terminals being supported on both lateral edges by one pair of first and second side plates and connected to adjacent pairs of the source and load terminals through different pairs of first and second side plates connected together into a unitary structure by having the projections and recesses on the first and second side plates fitted into and onto the mating recesses and projections on the other thereof.

In a preferred embodiment of the present invention, each of the source and load terminals includes on both of lateral edges a notch and each of the first and second side plates includes on the front surface a raised portion fitted into a mating one of the notches on the source and load terminals.

BRIEF DESCRIPTION OF THE DRAWINGS

The present invention will become more readily apparent from the following detailed description taken in conjunction with the accompanying drawings in which.

Throughout the Figures like reference numerals designate the identical or corresponding components.

DESCRIPTION OF THE PREFERRED EMBODIMENT

Figure 1:
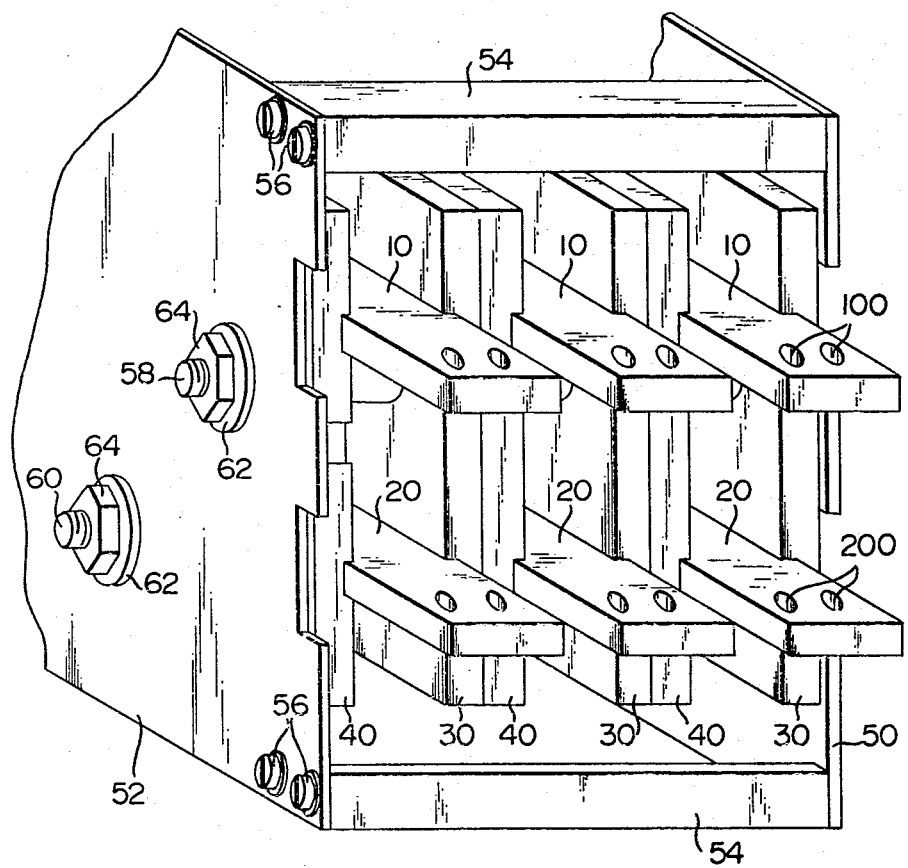
FIG. 1 is a perspective view of one embodiment of the terminal assembly of the present invention used, with some a circuit interrupter with parts omitted.
Figure 2:
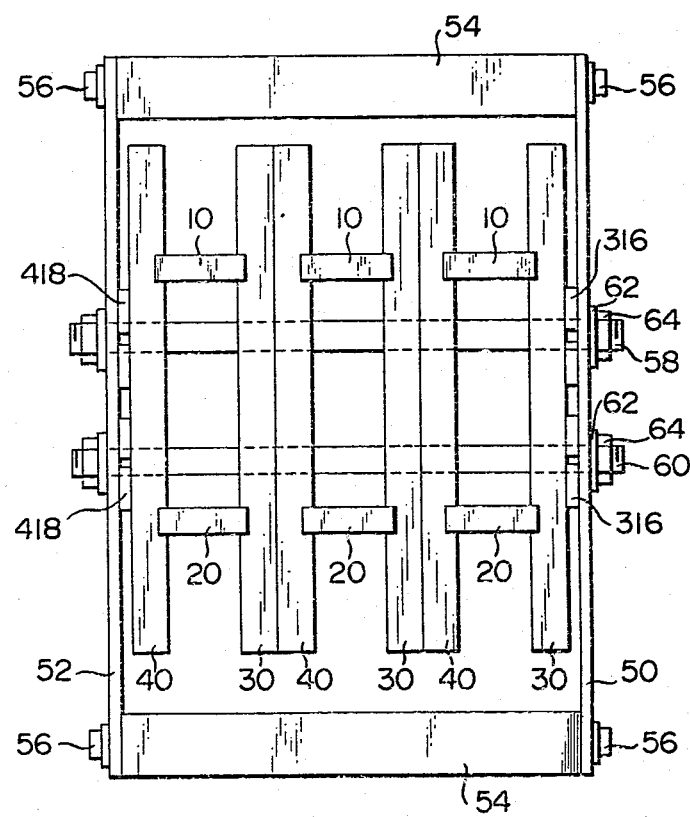
FIG. 2 is a front plan view of the arrangement shown in FIG. 1.

Referring now to FIGS. 1 and 2 of the drawings, there is illustrated one embodiment of the terminal assembly of the present invention used with a three phase current interrupter. The arrangement illustrated comprises a plurality of strip-shaped source terminals 10, in this case, three source terminals, one for each phase of the current interrupter (not shown) disposed at predetermined equal intervals in a common plane, and a plurality of strip-shaped load terminals 20 equal in both width and thickness to the source terminals 10, in this case, three load terminals, disposed in the same manner as the source terminals 10 and spaced thereunder as viewed in FIG. 1, one for each source terminal 10, and parallel to the source terminals 10 respectively. In the example illustrated, accordingly, the three source terminals 10 and the three load terminals 20 for the phases A, B and C are arranged in two rows and three columns. A pair of first and second side plates 30 and 40 having the same rectangular shape (see FIGS. 5 and 6) and made of an electrically insulating material are connected back to back to each other and interposed between each pair of adjacent source terminals 10 and also between each pair of adjacent load terminals 20 and extending parallel to the longitudinal axes of the source and load terminals 10 and 20. The leftmost source and load terminals 10 and 20 as viewed in FIGS. 1 and 2 are engaged by another second side plate 40 in the same manner as the intermediate source and load terminals 10 and 20 while the rightmost source and load terminals 10 and 20 are engaged by another first side plate 30 in the same manner as the intermediate source and load terminal and and load terminals 10 and 20.

Figure 3:
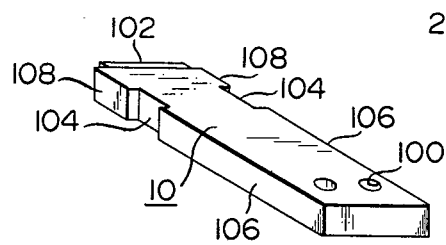
FIG. 3 is a perspective view of the source terminal shown in FIGS. 1 and 2.

FIG. 3 shows the details of the source terminal 10. As shown, the source terminal 10 includes a pair of threaded holes 100 adjacent to one end nearer to the viewer, which holes are also shown in FIG. 1, and a stationary contact 102 disposed at the other end thereof. Thus the source terminal 10 is arranged to be connected at the one end to an associated external electric conductor (not shown) by having a pair of screws (not shown) screw threaded into the holes 100 and separably connected at the other end to a mating movable electric conductor (not shown) included in a source circuit (not shown) within the current interrupter by having the stationary contact 102 separably engaging a movable contact (not shown) disposed at the end of the movable electric conductor.

Further, the source terminal 10 includes a pair of rectangular recesses 104 disposed in opposite relationship on both lateral edges 106 thereof defining a pair of opposite raised edges 108 on the lateral faces 106 between the recesses 104 and that end thereof bearing the stationary contact 102 for a purpose which will be apparent hereinafter.

Figure 4:
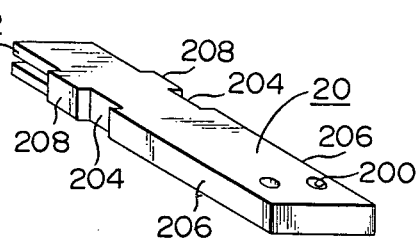
FIG. 4 is a perspective view of the load terminal shown in FIGS. 1 and 2.

FIG. 4 shows the details of load terminals 20. The arrangement illustrated includes a pair of threaded holes 200 disposed adjacent to one end thereof nearer to the viewer, which holes are also shown in FIG. 1 and a groove 202 disposed on the surface of the other end thereof extending throughout its width. Thus the load terminal 20 is ranged to be connected at one end to an associated external electric conductor (not shown) by having a pair of screws (not shown) screw threaded into the holes 200 and at the other end to an associated flexible electric conductor (not shown) included in a load circuit (not shown) of the circuit interrupter by inserting the end of the flexible conductor into the groove 202.

In other respects, the structure of FIG. 4 is identical to that shown in FIG. 3 excepting that the former is longer than the latter by about the depth of the groove 202. Therefore the components of the arrangement shown in FIG. 4 are designated by the same reference numerals identifying the corresponding ones of those shown in FIG. 3 but higher by 100. For example, the reference numeral 204 designates a recess on the lateral surface 206 of the arrangement shown in FIG. 4 to correspond to the recess 104 shown in FIG. 3.

As described above in conjuction with FIGS. 1 and 2, the three source terminals 10 and the three load terminals 20 for the phases A, B and C are arranged in two rows and three columns and held in place by the pair of the first and second side plates 30 and 40 interconnected back to back and interposed between each pair of adjacent columns with the outermost first and second side plates 30 and 40 engaged by the outmost pairs of the source and load terminals 10 and 20 respectively, whereby the pair of terminals 10 and 20 for each phase are physically isolated and electrically insulated from each other and from the remaining terminals 10 and 20 for the other phases.

Figure 5A:
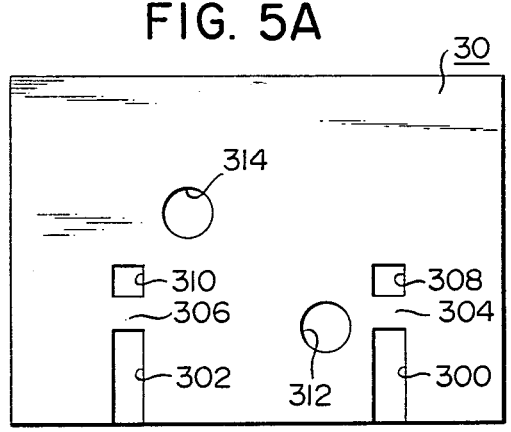
FIG. 5A is a front plan view of the first side plate shown in FIGS. 1 and 2.
Figure 6A:
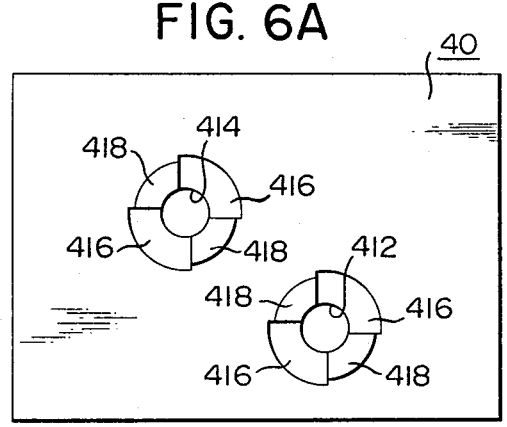
FIGS. 6A, 6B and 6C are views similar to FIGS. 5C, 5B and 5A respectively but illustrating the second side plate shown in FIGS. 1 and 2.
Figure 5B:
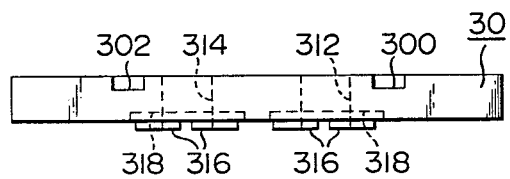
FIG. 5B is a side elevational view of the first side plate shown in FIGS. 1 and 2.
Figure 6B:
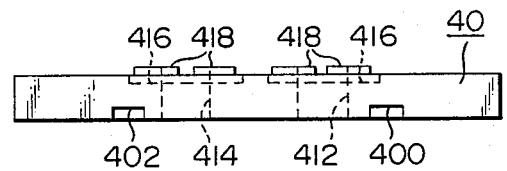
Figure 5C:
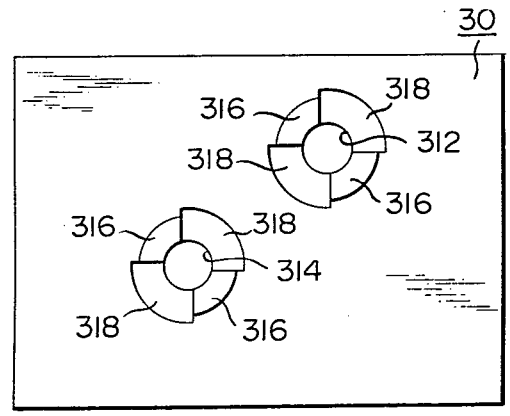
FIG. 5C is a rear plan view of the first side plate shown in FIGS. 1 and 2.
Figure 6C:
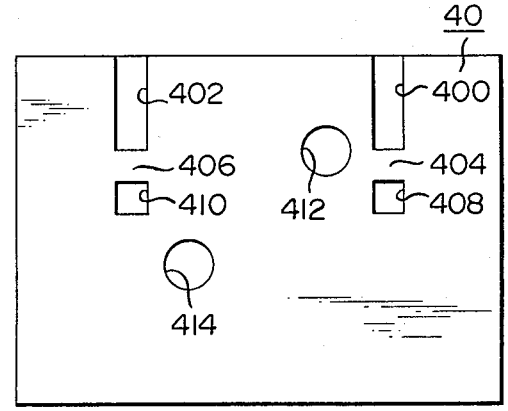

FIGS. 5 and 6 show the details of the first and second side plates 30 and 40 respectively. As shown in FIG. 5A, wherein there is illustrated the front surface of the first side plate 30, the latter has a rectangular shape and includes a pair of rectangular cross-section positioning grooves 300 and 302 spaced at a predetermined interval and extending from one longer side of the rectangle perpendicularly thereto and a pair of recesses 310 shown in FIG. 5A as being square and aligned with the respective grooves 300 and 302 lengthwise thereof with a space 304 and 306 formed between each of the grooves 300 or 302 and the adjacent recess 308 or 310. The grooves 300 and 302 are equal in length to each other, and equal in width to the adjacent recess 308 or 310 respectively.

The groove 300 and the recess 308 are so dimensioned that the groove 300 and the recess 308 firmly receive that portion of the lateral surface of the source terminal 10 near to threaded holes 100 and the raised face 108 thereof respectively and so that the spacing 304 forms a raised portion which is firmly fitted into the recess 104 in the source terminal 10.

Similarly the groove 302 and the recess 310 are so dimensioned that the groove 302 and the recess 310 firmly receive that portion of the lateral surface of the load terminal 20 near the threaded holes 200 and the raised face 208 thereof respectively and that the spacing 306 forms a raised portion which is firmly fitted into the recess 204 in the load terminal 20.

Also a pair of spaced circular holes 312 and 314 extend through the first side plate 30 adjacent to the diagonal thereof between the grooves 300 and 302 for a purpose which will be apparent later.

As shown in FIGS. 5B and 5C wherein there are illustrated the longer side and rear surface of the first side plate 10 respectively, a plurality of raised annular sectors 316, this case, two sectors are disposed around each of the circular holes 312 and 314 alternately with annular sector-shaped recesses 318 equal in angular length to the raised sector 316 for a purpose which will be apparent later.

From a comparison of FIG. 5 with FIG. 6 it will readily be understood that the second side plate 40 is a mirror image of the first side plate 30 with respect to a mirror disposed parallel to the front or rear surface thereof excepting that the raised sectors 316 and sector-shaped recesses 318 on the first side plate 30 are changed to sector-shaped recesses and raised sectors on the second side plate respectively. Thus the components on the second side plate 40 are designated by the same reference numerals identifying the corresponding components of the first side plate 30 but higher by 100. For example, the reference numeral 408 designates a recess on the second side plate 40 arranged to receive the raised face 106 on the source terminal 10.

From the foregoing it will readily be understood that the source and load terminals 10 and 20 can be firmly carried on the opposite sides by the first and second side plates 30 and 40 respectively and spaced from each other by a predetermined distance as determined the distance between the grooves 300 and 302 or the grooves 400 and 402.

In order to form the arrangement shown in FIGS. 1 and 2, the first and second side plates 10 and 20 are disposed back to back and then connected together into a unitary structure by fitting the raised sectors 316 on the first side plate 30 into the associated sector-shaped recesses 416 on the second side plate 40 while fitting the sector-shaped recesses 318 on the first side plate 30 over the raised sectors 418 on the second side plate 40.

The process as described above is repeated to connect another pair of first and second side plates 30 and 40 into a unitary structure.

Then, for example, one of the source terminals 10 for the phase A is disposed between the pair of unitary structures of the first and second side plates 30 and 40 thus formed and the edges 106 thereof are fitted into the positioning grooves 300 and 400 in the first and second side plates 30 and 40 respectively while the recesses 104 and the raised faces 108 on the lateral edges 106 of the source terminal 10 are engaged by the associated raised portions 306 and 406 and the associated recesses 308 and 408 on the first and second side plates 30 and 40.

Subsequently an associated one of the load terminals 20 is sandwiched between the pair of unitary structures of the first and second side plates 30 and 49 by fitting the lateral edges 206 thereof into the grooves 302 and 402 in the first and second side plates 30 and 40 and engaging the recesses 264 and the raised faces 208 thereof with the raised portions 306 and 406 on the first and second side plates 30 and 40 respectively.

Following this, the process as described above is repeated with the second side plate 40 disposed in opposed relationship with that first side plate 30 not yet engaging the source and load terminals 10 and 20 and with the first side plate 30 disposed opposed to that second side plate 40 not yet engaging the source and load terminals 10 and 20.

This results in the assembling of the source and load terminals for the phases A, B and C and the first and second side plates into a unitary structure as shown in FIGS. 1 and 2.

Then a pair of metallic plates 50 and 52 are disposed on the outermost first and second side plates 30 and 40 by engaging the inner surface thereof with the raised sectors 316 and 418 on the latter while a plurality of supporting rods 54, (two of which are illustrated only for purposes of illustration) are inserted between the metallic plates 50 and 52 and fixed to the plates 50 and 52 by means of a pair of screws 56 for each plate. Thereafter each of two bolts 58 or 60 is placed through a hole on each of metallic plates 50 or 52 and the holes 312 or 314 in the first side plate 30 and the hole 412 or 414 in the second side plate 40 aligned with one another as well as a hole on each metallic plates 50 or 52 aligned with the associated holes in the first and second side plates 30 and 40. Following this the end of each bolt 50 or 54 has a spring washer 62 placed thereover and then is secured to the associated metallic plate 50 or 52 by means of a nut 64 engaging the same.

Thus the assembling operation is completed.

From the foregoing it is seen that, the present invention provides a terminal assembly for a current interrupter capable of being assembled in a simple manner. This is because three pairs of source and load terminals are assembled into a unitary structure by carrying the terminals between the first and second side plates. Furthermore a pair of metallic plates are disposed outside of the outermost first and second side plates respectively and the inner surfaces thereof are engaged by the raised sectors on the first and second adjacent side plates. This measure results in an increase in creep distance. Thus the resulting structure has improved electric insulation.

While the present invention has been illustrated and described in conjunction with a single preferred embodiment thereof it is to be understood that numerous changes and modifications may be resorted to without departing from the spirit and scope of the present invention. For example, while the present invention has been illustrated and described in conjunction with three phase terminal assembly it is to be understood that the same is not limited thereby or thereto and that it is equally applicable to terminal assemblies including any desired number other than three of source and load terminal pairs one for each of phases or poles of the particular circuit interrupter. Also, instead of the two raised sectors alternating with the two sector-shaped recesses on the rear surface of each side plates the latter may include any desired number other than two of the raised sectors alternating the sector-shaped recesses.

What is claimed is:

1. A terminal assembly for a circuit interrupter, comprising:
   a plurality of pairs of metallic spaced parallel flat load terminals with the flat surfaces of the terminals of a pair opposed to each other, said pairs of terminals being positioned side-by-side with spaces therebetween, there being one pair for each phase of the interrupter;
   a plurality of side walls of insulating material, two between each side-by-side pair of terminals and abutting each other, and two end walls of insulating material on the outside of the outermost pairs of said terminals, said side walls and end walls having groove means therein in which the side edges of said terminals are engaged for being held between spaced opposed walls on the opposite sides of said terminals, said terminals projecting outwardly from between said side walls and said end walls past the edges of said wall on one side of said assembly, said side walls and end walls having substantially the same shape and having bolt receiving holes therethrough aligned with each other, and a plurality of projections at spaced intervals around said holes on the opposite sides of said walls from said groove means, and recesses in said walls between adjacent ones of said projections, the projections on one abutting wall engaging in the recesses around the corresponding aligned hole of the other abutting wall;
   a pair of metallic plates over the outer surface of said end walls, the projections on said end walls abutting said plates and spacing said walls and said plates; and
   a plurality of bolts extending through said metallic plates and through said walls and holding said plates, walls and terminals in the assembled condition.

2. A terminal assembly as claimed in claim 1 in which said projections are annular sector-shaped projections and said recesses are annular sector-shaped recesses.

* * * * *